June 26, 1945.  V. RAKOWSKY ET AL  2,379,184
PROCESS FOR DECORTICATING GRAIN
Filed Oct. 26, 1942  2 Sheets-Sheet 2
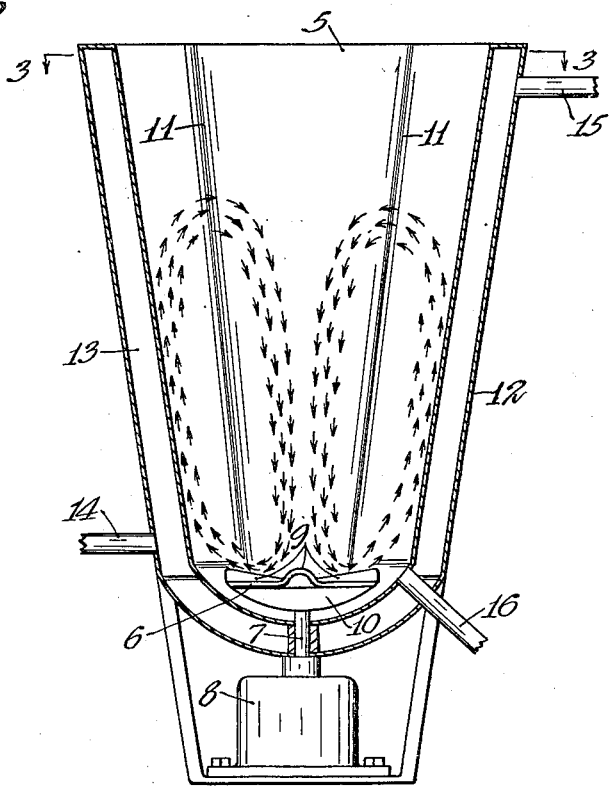
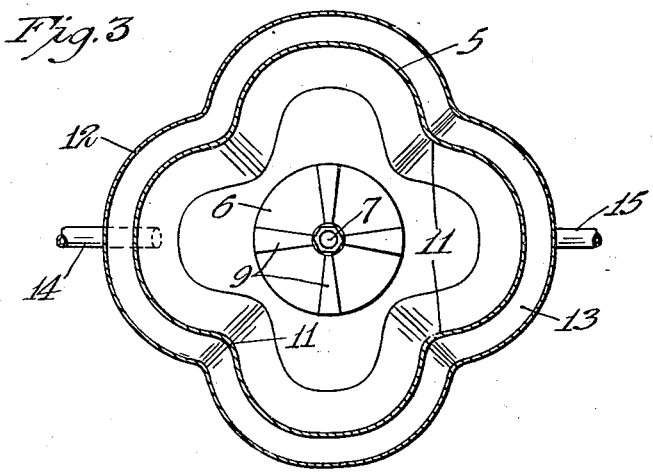
Inventors
Victor Rakowsky
Janis R. Reid
By John E. Stryker, Jr.
Attorney Patented June 26, 1945

2,379,184

UNITED STATES PATENT OFFICE 2,379,184

PROCESS FOR DECORTICATING GRAIN

Victor Rakowsky, Joplin, Mo., and Janis R. Reid, Madison, Tenn.

Application October 26, 1942, Serial No. 463,330

2 Claims. (Cl. 83—28)

Our invention relates to the separation of the outer husk and bran layers from wheat and other grains preparatory to either dry milling or other treatment, or to the wet pulping process described in our application, Serial No. 438,688, filed April 13, 1942, (Patent 2,358,827) for Process for producing flour.

The principal objects of the present invention are:

(1) To remove the outer husks or bran layers of wheat and other grains rapidly and economically and under such accurate control that any desired number of layers may be removed, leaving one or more inner layers intact with the vitamins and endosperm, thus making the vitamins which are known to be concentrated in the layers immediately enveloping the endosperm available in flour and increasing the yield of white flour.

(2) To provide a novel process for more thoroughly removing dirt and other foreign matter as well as husks and bran layers adjacent to and from the creases and surrounding the germs of the kernels of grain, and (3) To provide a process of this character which includes the steps of violently agitating the grain in a fluid medium containing solid, finely divided, non-toxic abrasive elements and separating the loose particles of bran and husk from the endosperm portions by allowing the latter to sink and the former to float in the medium.

(4) To provide an improved decorticating machine which affords accurate control of the number of bran and husk layers that are removed and whereby substantially the entire endosperm and any desired layers immediately enveloping the endosperm and germ may be left intact as a product.

(5) To provide a novel apparatus and process for rapidly and economically segregating the decorticated grain from the loose husk and bran particles.

The invention will be best understood by reference to the accompanying drawings in which:

Fig. 2 is a central vertical section through the tank of our improved decorticating machine and showing the power-driven impeller disk, and Fig. 3 is a horizontal section through the decorticating machine taken on the line 3—3 of Fig. 2.

Figure 1:
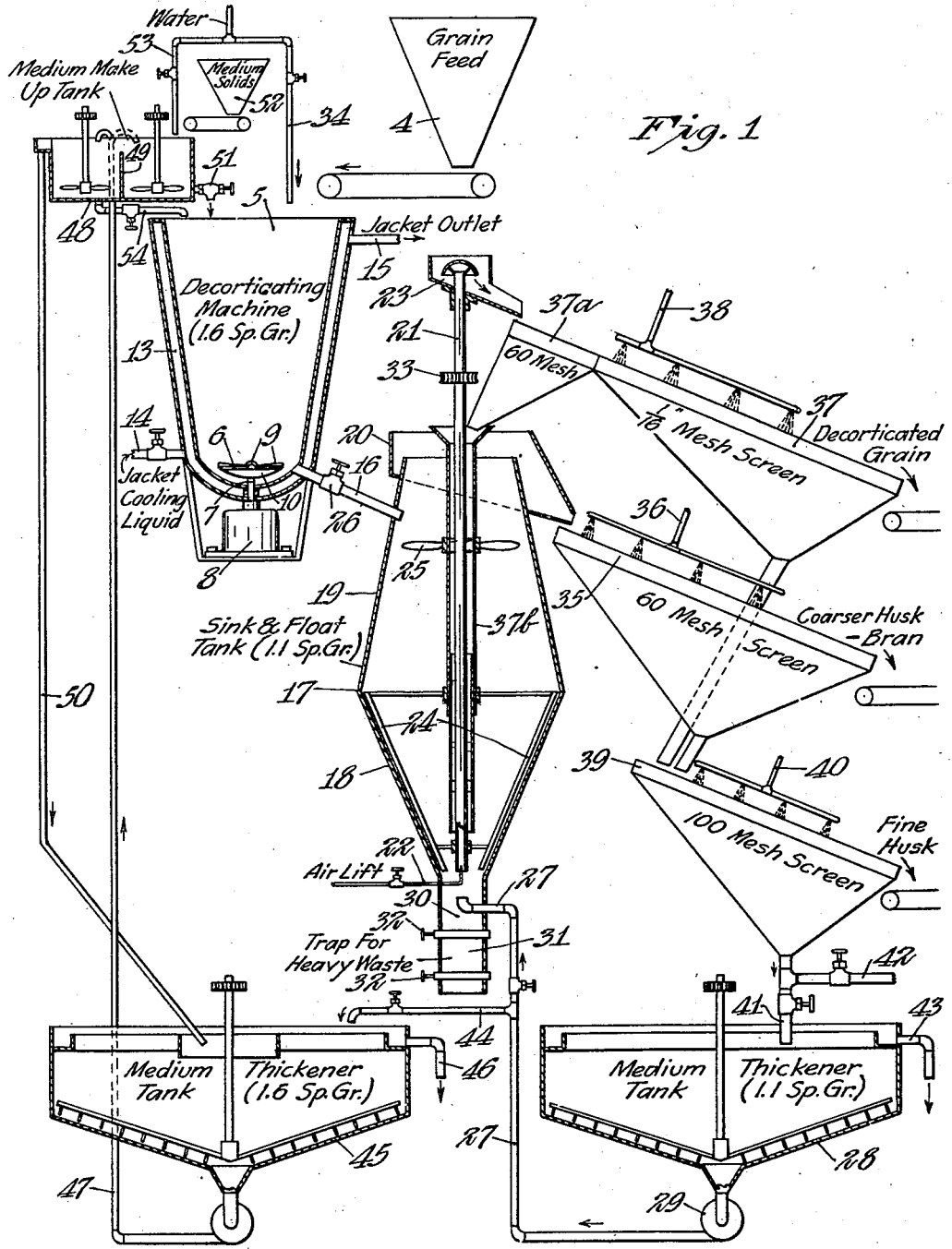
Figure 1 is a diagrammatic view illustrating one type of flow sheet and apparatus for carrying out our invention.

Wheat or other grain, after preliminary cleaning treatment either of the ordinary commercial type of that of the character described in the application of Victor Rakowsky, Serial No. 432,468, filed February 26, 1942, is fed to the tank 5 of our decorticating machine. Measured quantities of the grain may be fed from a hopper 4 to a feed conveyor and thence into the tank 5, as indicated in Fig. 1. A liquid medium preferably consisting of water and finely divided non-toxic solids is also charged into this tank in suitable proportions with the grain.

As shown in Figs. 2 and 3, the tank 5 has steeply inclined walls which converge downward toward the periphery of a centrally located impeller disk 6 which is mounted on a vertical, power-driven shaft 7 projecting up from the center of the bottom of the tank. The shaft 7 may be driven either directly, or indirectly through change speed gearing, by a variable speed motor 8. Disk shaft speeds of from 100 R. P. M. to approximately 13,000 R. P. M. may be employed. A series of radially extending beads 9 are formed in the disk 6 and arranged with their convex surfaces projecting upward. The bottom face of this disk is preferably covered by a spherical guard plate 10 or by one of conical shape which conforms approximately to the bottom of the tank and is designed to prevent the crushing or grinding of the grain between the disk and bottom of the tank. The disk has a continuous circular periphery and is otherwise designed to eliminate all sharp cutting edges which might cut deeply into the endosperm of the grain. To this end the disk may be provided with a polished, stainless steel surface or it may be coated with rubber or other material having similar characteristics and the desired hardness to resist abrasion and to adapt the disk for service with various grains.

The walls of the tank 5 are fluted, as shown in Fig. 3, so that ridges 11 project inward, with similar, internally concave lobes between the ridges. By this construction we prevent the entire mass of fluid in the tank from revolving about the axis of the tank and cause the kernels of grain to impinge against the ridges 11 and be directed thereby upward along the vertical axis of the tank. An outer casing 12 is spaced from the tank 5 to provide a jacket space 13 through which liquid may be circulated to control the temperature of the material in the tank. Liquid may be forced in under pressure through a pipe 14 and overflowed through a pipe 15 and the contents of the tank 5 may be drained through a pipe 16 which communicates with the bottom thereof near the periphery of the disk 6. When provision is made for driving the shaft 7 at various speeds between 100 to 13,000 R. P. M. the higher range of speeds is used during the decorticating process and the lower ranges in starting and in mixing the grain and medium preparatory to the high speed operation and subsequently thereto. When water is used as the liquid vehicle for the grain approximately three parts of water to two parts of finely divided abrasive solids and one part by weight of grain is preferably used in the tank 5.

In operation, the grain and liquid medium having been charged into the tank 5, the impeller disk 6 is operated most efficiently at speeds from 5000 to 13,000 R. P. M. This circulates the fluid contents of the tank at a high velocity and causes the kernels of grain and liquid to be carried in a path which extends radially outward at the bottom of the tank, thence upward along the walls spirally in each lobe of the tank, then inward and down in a spiral at the center. The centrifugal force is such that a column of air is drawn down centrally of the tank and extends substantially to the central portion of the disk. The kernels of grain pass rapidly down the periphery of this column, then obliquely forward and down in the direction of rotation of the disk so that they strike the upper face of the disk while traveling at this acute angle thereto. They next strike and are rolled spirally up the walls and are then directed into the central vortex by the ridges 11, this circuit being traveled many times during a short period of operation. Decortication is effected solely by the impingement of the kernels against the disk, walls of the tank and each other while the kernels and liquid are traveling at high velocities. At no time do the kernels encounter sharp cutting edges which would cut deeply or irregularly into the endosperm.

By the combined action described, which is readily controllable by regulating the speed of the impeller disk, by limiting the time of operation and by controlling the amount of water added to the grain, thus controlling the pulp density, the bran and husk layers may be removed to any desired extent and substantially all foreign matter and bran and husk layers may be removed from the crease of each kernel while the germ bodies may be exposed by removal of the contiguous bran and husk layers.

Where, as is usually the case, it is desired to leave the aleurone and certain other inner vitamin bearing layers intact with the endosperm, the high speed operation of the machine is discontinued after a short period of time which may vary between four and ten minutes for most varieties of wheat, the time of operation depending on the dryness, hardness, size of kernels and variety of the grain which is fed into the tank 5. Such operation of the machine causes the water to penetrate deeply into the endosperm and to thereby temper the kernels sufficiently for further treatment by conventional dry milling processes. It has been found that the effect on the several kernels of a batch is substantially uniform both in the depth of the decortication and in the penetration of moisture. During the high speed operation considerable heat is generated in the liquid mass and this should be dissipated by circulating cold water or other cooling liquid in the jacket space 13. After the desired husk and bran layers of the kernels have been freed by operation of the decorticating machine for a suitable period of time the resulting mixture must be separated into its components of liquid vehicle, decorticated kernels and loose husk and bran particles.

It has been found that if finely divided solids are added to the water in the tank 5 such solids have the effect of minimizing the degradation of the particles of husk and bran and also of increasing the specific gravity of the mass. Suitable solids for this purpose are non-toxic calcium and/or magnesium compounds such as limestone or dolomitic limestone reduced to a fine powder of minus 100 mesh. We have obtained excellent results by employing in the decorticating machine one part of wheat to two parts of water and three parts of finely divided limestone by weight. To this fluid medium consisting of water and limestone solids having a specific gravity of approximately 1.6 in the tank 5 the wheat may be added. After operating the decorticating machine for the desired period of time the necessary separation of the decorticated kernels from the medium and loose husk and bran particles may be efficiently and rapidly accomplished as a continuous process by employing apparatus including a suitable sink and float tank, as illustrated in Fig. 1 of the drawings.

Our sink and float tank, indicated generally by the numeral 17, has a conical bottom portion 18 arranged with its small end down and a conical upper portion 19 disposed with its smaller, open end up and provided with an overflow launder 20. An axially disposed pipe 21 communicates with the interior of the tank near the bottom and is provided with a small air lift connection comprising a pipe 22 which discharges air under pressure into the lower end of the pipe 21. At its upper end the pipe 21 is arranged to discharge into a small launder 23. Provision is made for rotating the pipe 21, the lower end portion of which is fitted with rake arms 24 for removing solids from the sloping walls of the tank. Also fixed on the pipe 21 is a pair of blades 25 adapted to break up agglomerations of feed material and distribute the grain which is fed into the upper portion of the tank from the pipe 16 under control of a valve 26.

The tank 17 is supplied with the fluid medium consisting of water and comminuted solids so as to maintain the specific gravity of the medium therein somewhat above 1.0 and thereby promote the rapid floating of the particles of husk and bran while allowing the kernels of grain to sink in the tank. The medium is fed under pressure into the bottom of the tank 17 through a pipe 27 from a suitable source, such as a medium thickener tank 28 from the bottom of which the medium is discharged by a pump 29. Notwithstanding the preliminary cleaning of the grain some dirt and other foreign matter usually remains in the creases of the kernels and other coarser material such as stones, particles of glass and metal remain mixed with the grain. It is desirable to provide for the separation of such foreign matter from the other constituents of the pulp produced in the decorticating machine. For this purpose, the bottom of the tank 17 is formed with a sump 30 and trap 31 which may be periodically emptied of accumulations of heavy waste by operating slide valves 32 controlling the discharge from the trap in suitable manner.

In the operation of the sink and float tank, medium, preferably at approximately 1.1 specific gravity, is continuously supplied through the pipe 27 to the bottom of the tank 17 and overflows at the top into the launder 20 while the pipe 21 is rotated slowly by power applied to a gear 33 or otherwise so that the rake arms 24 prevent accumulations of solids on the walls of the tank and the blades 25 are slowly revolved to break up agglomerations of the feed material entering through the pipe 16. Before feeding the decorticated grain mixed with the loose husk and bran layers and medium from the tank 5 to the tank 17, the mixture in the tank 5 is preferably diluted by adding water from a suitable source, such as the pipe 34, until the specific gravity of the pulp is reduced to approximately that of the meduim in the tank 17. When this has been done, the valve 26 is opened so that the pulp flows into the tank 17.

Decorticated wheat kernels ordinarily have a specific gravity above 1.2 but not higher than 1.5 so that when such kernels reach the tank 17 they immediately settle to the bottom in the 1.1 medium therein and are withdrawn by the operation of the air lift through the pipe 21 which discharges them into the launder 23 together with some of the medium, while the husk and bran particles float to the top of the tank 17 and overflow with a quantity of medium into the launder 20. This overflow product is fed to the upper edge of a screen 35 of such mesh as to retain the bulk of the husk and bran as the screen oversize and to allow the medium, together with a small amount of extremely fine husk material, to pass through the screen. In passing down the sloping screen the oversize material is first washed by suitable sprays from a water supply pipe 36 and then drained of the bulk of the water and discharged onto a conveyor or into a suitable receptacle.

The decorticated grain, together with some medium, flows from the launder 23 to a screen 37a of such mesh as to retain the kernels while allowing the passage through the screen openings of the medium. The underflow from the screen 37a is returned to the lower portion of the tank 17 through a pipe 37b which is coaxially disposed along and in outwardly spaced relation to the pipe 21, being revoluble therewith and affording a support for the blades 25 and rake arms 24. Telescoping members of the pipe 37b are relatively adjustable to permit delivery of the medium at various depths in the tank. From the screen 37a the decorticated kernels pass to a second screen 37 of somewhat larger mesh on which the kernels are supported while they pass under water sprays supplied by a pipe 38. These sprays remove adhering particles of fine bran and husk as well as adhering medium and the kernels finally pass over a drainage section of the screen and fall from the lower end to a conveyor or other receptacle for the product. For most varieties of wheat, the screen 37a should have approximately sixty openings to the inch and for the screen 37 openings of approximately 1/16 of an inch in width are preferred.

The underflow from the screens 35 and 37 is preferably fed to a third screen 39 of smaller mesh, such as 100 openings to the inch, adapted to separate the fine bran and husk particles from the dilute medium which passes through the screen openings. This fine husk product is washed by water sprays supplied by a pipe 40 and, after draining, is discharged from the lower edge of the screen 39 while the screen undersize, comprising dilute medium, may be conveyed through a pipe 41 to the medium thickening tank 28 for reuse both in the decorticating machine 28 and in the sink and float tank. To free the screens 35, 37a, 37 and 39 of the oversize material and advance this material to the point of discharge, these screens may be vibrated by conventional mechanism.

After a number of cycles of operation the underflow from the screen 39 may be drawn off through a pipe 42 and either wasted or passed through a suitable medium cleaning system for further use. The overflow from the medium thickener tank 28 is discharged through an overflow pipe 43 and may be either wasted or used as the supply for the spray pipes 36, 38 and 40. For operation with wheat and certain other grains the medium thickener tank 28 is preferably designed and operated to produce an underflow medium consisting of water and comminuted solids having specific gravity of approximately 1.1 which corresponds to the specific gravity of the medium in the sink and float tank 17. The excess of medium above that required in this tank is preferably drawn off through a branch 44 of the pipe 37 and is fed to a second thickener tank 45 of conventional type but designed to produce an underflow medium having a specific gravity corresponding to that in the tank 5. Overflow water from the tank 45 may be conducted through a pipe 46 to waste or for use in the screen sprays while the underflow, thickened medium may be pumped through a pipe 47 for use in the tank 5. As illustrated, the pipe 47 feeds a medium make-up tank 48. Since an intermittent supply of medium is required for the batch operation of the decorticating machine, we provide the tank 48 with a partition 49 from one side of which the medium may be allowed to overflow and return through a pipe 50 to the tank 45. From the other compartment of the tank 48 the medium may be withdrawn through a valve-controlled outlet 51 arranged to supply the tank 5. Measured quantities of make-up solids and water are fed to the tank 48 from a hopper 52 and pipe 53 respectively and suitable stirring mechanism is provided in the tank 48 to maintain a uniform suspension of the solids. Medium may be fed from the bottom of the left compartment of the tank 48 through a valve controlled pipe 54 which is arranged to discharge into the decorticating machine.

Since the time required for the decorticating treatment is short and this is a batch operation, the efficiency of our process is improved by having a quickly available supply of medium for the decorticating machine and also providing for the dumping of a measured and proportionate quantity of grain into that machine. To afford such quickly available supply of medium, the tank 48 may be made large enough so that either of its compartments has sufficient capacity to supply an entire batch of medium and the pipe 47 is arranged to feed either of these compartments. In operation, one of these compartments is kept filled so that a batch of medium is always available for use when required. Commercial operation may be further expedited by providing a storage tank (not shown) between the decorticating machine and sink and float tank 17 and by supplying such storage tank from the pipe 16 and feeding tank 17 from the storage tank.

It will be evident that the apparatus and connections hereinbefore described provide a closed circuit for the efficient and economical handling of the medium and also for the replacement in the circuit of the small amount of medium solids which is discharged with the decorticated grain product from the screen 37 and with the separated husk and bran product from screen 36 as well as that lost in the overflow of the thickener tanks 26 and 46 when such overflow is wasted. The calcium and magnesium compounds which we prefer as the solids of the medium are of such character as to be beneficial rather than detrimental in the small quantities that cannot be entirely eliminated from the food products for human or animal consumption.

Our decorticated grain product as discharged from the screens is ready for further processing and is particularly adapted either for production of flour by ordinary dry milling processes or by our wet process described in our application Serial No. 438,688. We improve the flour made therefrom since it contains an unusually high percentage of all of the vitamins present in the germ and in the several layers including the aleurone which immediately envelope the endosperm and also contains an unusually large proportion of the entire endosperm in condition for the production of flour with a high yield as compared with conventional dry milling processes. A further advantage of our process resides in the fact that it delivers the individual decorticated kernels with all of the foreign matter and bran, if desired, removed from the creases, which in the case of wheat, barley and some other grain extend deeply into the kernels and cannot be completely cleansed by ordinary procedure. These kernels, being tempered, do not require the usual steeping as a preliminary to the subsequent dry milling process.

To produce flour by our wet pulping process from the decorticated grain, the latter may be reduced to a wet pulp or paste by treatment in a machine such as that described in our application Serial No. 438,688. Thereafter the resulting pulp is filtered to remove the remaining bran and husk layers and the filtrate may be either spray dried or dried on drums and thereafter ground, bolted and bleached, to produce premium grade white flour of high vitamin content.

Our bran and husk product with such of the endosperm as remains in this product may be used in making alcohol or may be pressed into cakes, or otherwise used as a livestock feed. When used to treat corn, our process is valuable for preparing the inner portions for use as hominy or other cereal product. Increased production of alcohol from corn and other cereal products may be obtained by using our process to remove a minimum of the outer, non-starchy layers of the kernels so that a maximum of the starch-producing constituents are made available in the corn which is fed to the alcohol-producing plant. By the controls described our decorticating machine may be operated to remove the outer portions of the kernels to any desired depth, leaving the inner portions intact and of substantially uniform composition.

Having described our invention, what we claim as new and desire to protect by Letters Patent is:

1. The process for separating bran and husk layers from grain which comprises, feeding the grain and a fluid medium into a tank, said medium having a specific gravity in excess of one incident to the addition of solid, finely divided, non-toxic abrasive elements, violently agitating the grain and medium in the tank to remove the desired bran and husk layers solely by abrasion and impact, leaving the endosperm portions of the kernels substantially intact and separating said endosperm portions of the kernels from the loose particles of bran and husk by floating said particles in the medium and allowing the endosperm portions to sink in the medium.

2. The process for separating bran and husk layers from kernels of grain which comprises, feeding the grain and a fluid medium containing finely divided non-toxic solids into a tank, the specific gravity of said medium being higher than that of the kernels, violently agitating the grain and medium in the tank to remove the desired bran and husk layers by abrasion and impact, leaving the inner portions of the kernels intact, reducing the specific gravity of the resulting mixture to form a fluid medium in which said inner portions of the kernels will sink and in which all of the husk and bran particles will float, allowing said particles to float and the inner portions to sink in the dilute medium, separately withdrawing from the dilute medium the float and sink products and screening and washing said products to separate the medium therefrom.

VICTOR RAKOWSKY.
JANIS R. REID.